United States Patent Office 2,992,380
Patented July 11, 1961

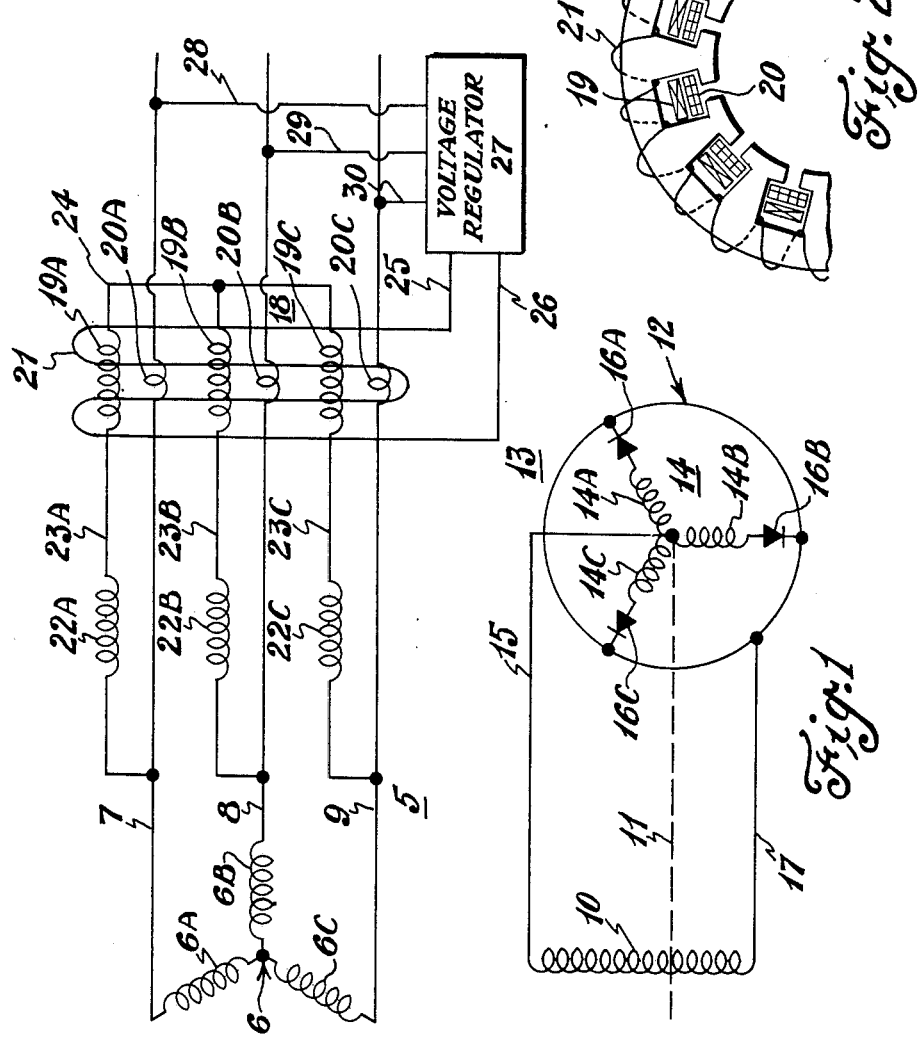

2,992,380
DYNAMOELECTRIC MACHINE
Frederick M. Potter, Westwood, N.J., assignor to The Bendix Corporation, a corporation of Delaware
Filed Sept. 29, 1958, Ser. No. 764,087
3 Claims. (Cl. 322—25)

The present invention relates to dynamoelectric machines and more particularly to a brushless A.C. generator.

Present A.C. generators require a source of direct current for excitation. Separate exciters have been provided and are connected to energize the rotating field of the generator through slip rings. Various arrangements have been tried for a brushless A.C. generator, however, in order to achieve voltage control, it has been necessary to pass the current from the exciter through some kind of voltage regulator which requires the use of slip rings or brushes.

The present invention provides a novel solution to the excitation problem of brushless A.C. generators. The excitation current for the rotating field is furnished from an exciter armature winding connected through rectifiers and mounted on the same shaft. Voltage control is obtained by means of a saturating winding on the exciter stator. The exciter is energized from the output of the A.C. generator.

It is an object of the invention to provide an improved dynamoelectric machine.

Another object of the invention is to provide an improved brushless A.C. generator.

Another object of the invention is to provide a novel method of excitation for a dynamoelectric machine.

Another object of the invention is to provide an improved saturable and compounded A.C. exciter brushless alternator.

The above and other objects and features of the invention will appear more fully hereinafter from a consideration of the following description taken in connection with the accompanying drawing, wherein one embodiment is illustrated by way of example.

In the drawing:

FIGURE 1 is a diagrammatical representation of a device embodying the invention.

FIGURE 2 is a sectional view of the exciter stator for an explanation of the invention.

Referring now to FIGURE 1, a dynamoelectric machine is indicated generally by the numeral 5 and is presented schematically. It is understood, however, that it would have a conventional housing. The machine 5 has a stator winding 6, which, for example, is illustrated as a three phase winding 6A, 6B and 6C. The windings 6A, 6B and 6C are connected to output conductors 7, 8 and 9 respectively.

The machine 5 has a field winding 10 adapted to be rotated from a driving source (not shown) by a shaft indicated by dashed line 11. Also mounted on the shaft 11 is a rotor 12 of an exciter 13. The rotor 12 has a winding 14, illustrated as three phase 14A, 14B and 14C. The neutral of the winding 14 is connected by conductor 15 to one side of the winding 10. The output terminals of the windings 14A, 14B and 14C are connected through rectifiers 16A, 16B and 16C and conductor 17 to the other side of the winding 10.

The exciter 13 has a stator 18 which includes voltage windings 19A, 19B and 19C, current windings 20A, 20B and 20C and control winding 21. The voltage windings 19A, 19B, and 19C are connected in series with reactors 22A, 22B and 22C by conductors 23A, 23B and 23C which are connected to the respective output lines 7, 8 and 9. The other end of the windings 19A, 19B and 19C are connected by a conductor 24; the current windings 20A, 20B and 20C are connected in series with the respective output conductors 7, 8, and 9.

The control winding 21 is connected by conductors 25 and 26 across the output of a voltage regulator 27. The regulator 27 is connected by conductors 28, 29 and 30 to the respective output lines 7, 8 and 9.

FIGURE 2 is a sectional view of the stator 18 showing the relationship of the windings 19, 20 and 21. The stator 18 comprises laminations with a plurality of slots symmetrically and equally spaced around the periphery of the base.

In operation, power from the main A.C. generator output is converted through voltage and current windings in the exciter stator to higher frequency power in the exciter rotor which is rectified by rotating rectifiers and energizes the rotating field of the main A.C. generator. The power supplied to the voltage windings is supplied through linear reactors which are in series between the main A.C. generator terminals and the windings. The reactors limit the amount of power transferred into the voltage windings and also prevents them from being short-circuited when a full three phase fault is applied across the generator output. The load current of the main generator is carried through the current windings and provides means for compounding the exciter output in proportion to the load on the main generator.

The exciter is designed so that at all times it delivers more power than the rotating main generator field requires. In order to limit the output of the exciter to that which the main generator requires, a D.C. saturating winding is wound in toroidal fashion around the core portion of the exciter stator. This winding is energized in accordance with the output voltage of the main generator and controls the saturation of the magnetic circuit of the exciter.

Of particular advantage is the use of power from the main generator as the excitation for the exciter. In a specific design the main generator will have a 400 cycle output, which when applied to an exciter having twelve poles, will produce an output frequency in the exciter armature of 1000 cycles. This higher frequency provides a design of smaller size and lighter overall weight. In addition, this design has exceedingly fast response to transient loads due to its current compounding features.

Although only one embodiment of the invention has been illustrated and described, various changes in the form and relative arrangement of the parts, which will now appear to those skilled in the art, may be made without departing from the scope of the invention.

What is claimed is:

1. A brushless A.C. generator comprising a main generator and an exciter, said main generator having a stator and a rotor, an output winding on said stator, an excitation winding on said rotor, said exciter having a stator and a rotor, said rotor being mounted for rotation with said man generator rotor, an output winding on said exciter rotor, means including rectifiers connecting said exciter rotor output winding to said main generator excitation winding, a voltage winding and a current winding on said exciter stator, means including a linear reactor connecting said voltage winding to the output of said main generator, circuit means connecting said current winding in series with said main generator output, and means including a toroid winding on said exciter stator for controlling the excitation of said exciter in accordance with a condition of said main generator output.

2. A brushless A.C. generator comprising a main generator and an exciter mounted on a common shaft, said main generator having a rotor excitation winding and a stator output winding, said exciter having a rotor output winding and stator current and voltage excitation windings, rectifying means connecting said exciter rotor output winding to said main generator rotor excitation winding, circuit means connecting said exciter stator current winding for energization in accordance with the output current from said main generator, means including linear reactors for connecting said voltage winding in response to the output voltage of said main generator, and means including a control winding on said exciter stator for controlling the output thereof in accordance with the output voltage of said main generator.

3. A brushless self-excited A.C. generator comprising a main generator and an exciter mounted on a common shaft, said main generator having a rotor excitation winding and three phase stator output windings, said exciter having three phase star connected rotor output windings and three phase stator voltage and current windings, means including linear reactors for star connecting said voltage windings across said generator output windings, circuit means connecting said current windings in response to the current flowing in said generator output, means including a control winding on said exciter stator for controlling the saturation thereof in accordance with the output voltage of said main generator, and rectifying means connecting said exciter output windings to said main generator excitation winding.

References Cited in the file of this patent

UNITED STATES PATENTS

| | | |
|---|---|---|
| 1,736,618 | Nickle | Nov. 19, 1929 |
| 2,414,287 | Crever | June 14, 1947 |
| 2,482,875 | Sawyer | Sept. 27, 1949 |
| 2,722,652 | Brainard | Nov. 1, 1955 |
| 2,836,786 | Scharstein et al. | May 27, 1958 |
| 2,839,716 | Harz | June 17, 1958 |